United States Patent [19]

Guest

[11] 4,005,883
[45] Feb. 1, 1977

[54] TUBE COUPLINGS

[76] Inventor: John Derek Guest, "Iona" Cannon Hill Way, Bray, Maidenhead, Berkshire, England

[22] Filed: Aug. 1, 1975

[21] Appl. No.: 600,941

[30] Foreign Application Priority Data

May 8, 1974 United Kingdom ............ 34327/74

[52] U.S. Cl. .............................................. 285/322
[51] Int. Cl.² ........................................ F16L 21/06
[58] Field of Search .......... 285/321, 322, 323, 113, 285/35, 156

[56] References Cited

UNITED STATES PATENTS

| 3,243,206 | 3/1966 | Samer | 285/322 X |
| 3,454,290 | 7/1969 | Tairraz | 285/323 X |
| 3,560,026 | 2/1971 | Roe | 285/322 X |
| 3,653,689 | 4/1972 | Sapy et al. | 285/323 X |
| 3,684,321 | 8/1972 | Hundnausen et al. | 285/319 X |
| 3,743,326 | 7/1973 | Courtot et al. | 285/323 X |
| 3,773,360 | 11/1973 | Timbers | 285/321 X |
| 3,884,513 | 5/1975 | Gassert | 285/322 |

Primary Examiner—G. V. Larkin
Attorney, Agent, or Firm—Graybeal, Barnard & Uhlir

[57] ABSTRACT

A tube coupling comprises a collet with resilient arms arranged to co-operate with a cam surface of a surrounding body or sleeve, the cam surface tapering in the axial direction such that, as a tube in the collet is pulled outwardly, frictional pull between the tube and collet causes the collet to move in a direction to tighten the grip on the tube. The arms of the collet are spaced apart radially such that, in the absence of any tube, the collet can be withdrawn outwardly from the sleeve or body. Pushing the collet inwardly into the sleeve or body allows the arms to move radially outwardly and then the tube can be withdrawn. The collet has a flange or the like extending radially outside the sleeve or body and a spring clip is provided between this flange and the sleeve or body to lock the coupling against release of the tube. By using such a clip holding the collet outwardly of the body, the arms of the collet are retained in a position gripping the tube; the clip prevents the collet from being pushed inwardly to release the tube.

18 Claims, 11 Drawing Figures

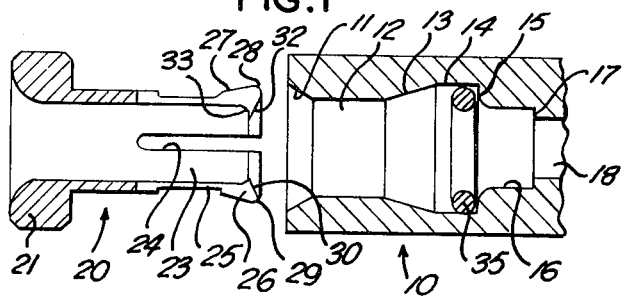
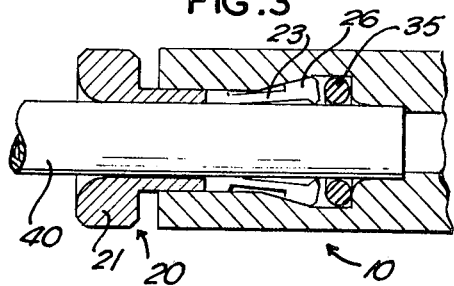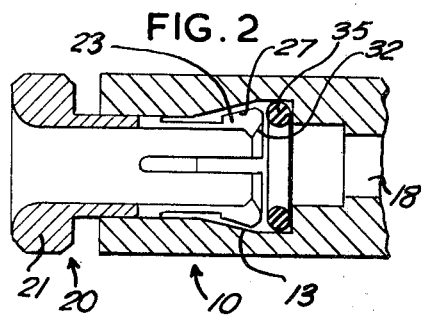
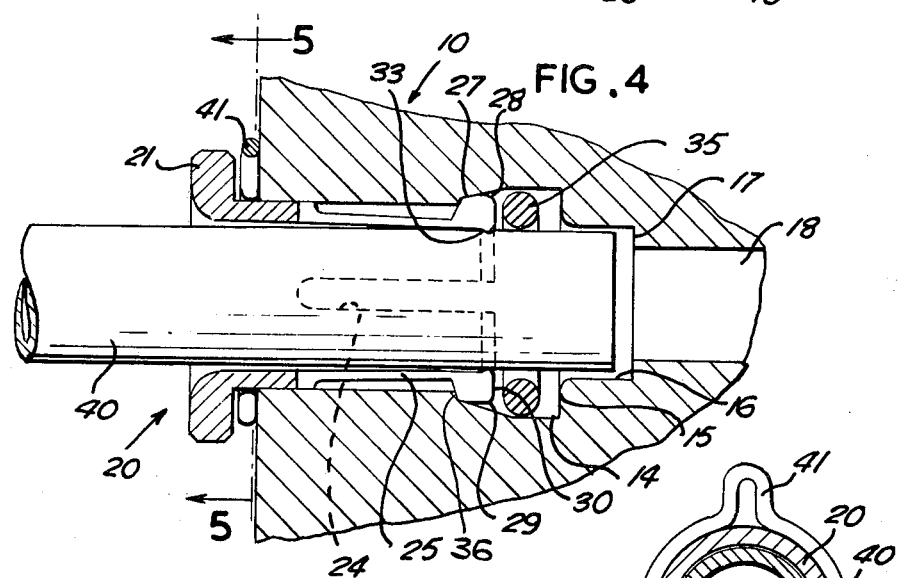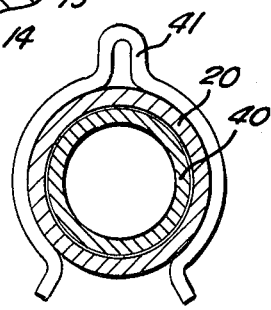

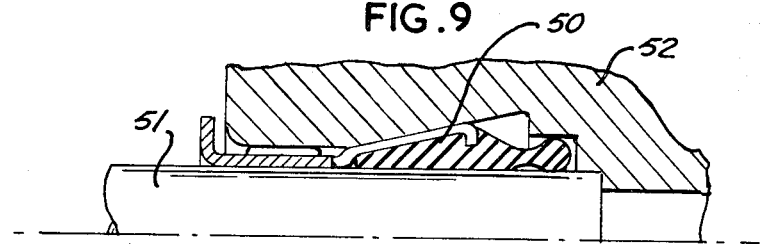
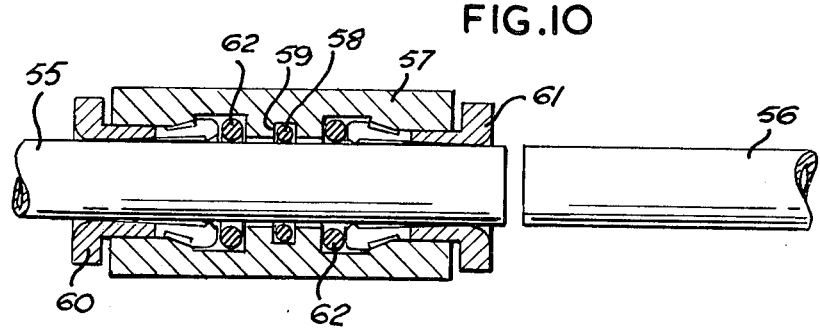
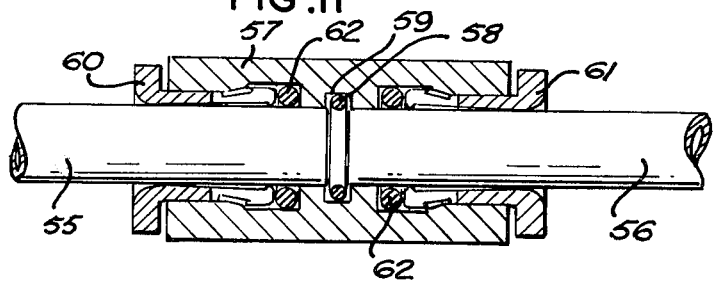

TUBE COUPLINGS

BACKGROUND OF THE INVENTION

This invention relates to coupling for tubes.

The invention is more particularly concerned with a tube coupling of the kind having a collet with resilient arms arranged to co-operate with a cam surface on a member surrounding the collet, which member has an internal surface tapering in one axial direction and engaging the arms of the collet so that the fingers are forced inwardly by axial movement of the collet in one direction. With such a tube coupling, the end of the tube may be pushed into the coupling through the collet from the end thereof remote from the arms. Any outward pull on the tube with respect to said member surrounding the collet tends, by the engagement between the collet and the tube, to pull the collet in the direction to remove it from said member and thereby causes the arms, by engagement with the cam surface, to grip the tube more tightly. Provided the coupling is of the appropriate size to fit the tube, if a tube is inserted in the collet, the inward movement of the arms is restricted and hence the collet cannot be withdrawn outwardly from said member. This arrangement thus gives a form of coupling in which the end of the tube can be inserted directly into the coupling and is engaged thereby in a manner which prevents withdrawal of the tube merely by any pull thereon. The tube can be released however by pushing the collet inwardly into said member whilst pulling the tube outwardly; thus release can only be effected by a deliberate action and not by accidental pull on the tube.

It is an object of the present invention to provide an improved form of tube coupling of this kind. In considering the problems with prior types of constructions, it is convenient to refer to the end of the collet having the arms as the inner end and the other end of the collet as the outer end; the arms thus extend from a point along the length of the collet towards the inner end. In prior types of coupling, the taper on the cam surface, which taper is such that the diameter reduces from the inner end towards the outer end, has necessitated that the collet should be inserted into the member forming the cam surface from the inner end of that memer. This then leads to the requirement that the main body of the coupling must be formed in two parts so as to permit the assembly of the collet into a part having the required cam surface and then the securing of this member into a main part of the body. Also, since the collet has to be assembled into the member with the cam surface from the inner end thereof, the maximum diameter of the base of the collet, that is to say the part towards the outer end, must not exceed the minimum diameter of the aforementioned member having the cam surface. One is thus led to a construction in which the main body is formed in two parts. In one form of construction, such as that shown for example in U.S. Pat. No 3,454,290, these two parts can be threaded one on to the other so that they can be separated by being unscrewed when it is required to obtain access to the collet to enable a tube to be withdrawn. If the two parts of the body are secured together after the collet has been assembled in the cam surface member, then release of a tube from the coupling can only be effected by ensuring that the collet protrudes outwardly from the body. However this part of the collet, as explained above, must not have any portion of greater diameter than the minimum diameter of the cam surface member. In practice this means that the end of the collet is a relatively thin cylinder, as for example in the constructions of U.S. Pat. No. 3,653,689, thereby raising problems in applying axial pressure to this collet when a tube is to be released. It is possible, as shown in U.S. Pat. No. 3,743,326, to swage the outer end of the collet radially outwardly thereby increasing its diameter but this results in the collet being permanently secured onto the member surrounding it, so preventing dismantling of the assembly.

SUMMARY OF THE INVENTION

According to this invention, in a tube coupling of the kind having a collet with resilient arms arranged to co-operate with a cam surface constituted by a member surrounding the collet and having an internal surface tapering in one axial direction engaging the arms so that the fingers are forced inwardly by axial movement of the collet in said one direction, the collet has its arms spaced apart in the circumferential direction such that, in the absence of any tube within the collet, the arms can move inwardly to permit of the collet being withdrawn from said member by axial movement in said one direction.

By adequately spacing the arms in this way so that they can deform inwardly sufficiently to permit of withdrawal of the collet from the member, it now becomes possible to insert the collet into this member from the outer end thereof. This immediately leads to a number of significant advantages. In the first place the body of the tube coupling can be made as a unitary structure incorporating the cam surface instead of having to be made in at least two parts as heretofore. This obviously simplifies the construction. The assembly of the coupling unit is simplified in that the collet can readily be inserted from the outer end.

A further very important advantage however of this construction, which arises because the collet can be inserted from the outer end, is that there is now no restriction on the diameter of the outer end of the collet. The collet therefore may extend radially outwardly at the outer end to be larger than the bore in said member, e.g. the collet may have a radially extending flange at the outer end, that is to say the end remote from the arms. Such a radial extension or flange facilitates the applying of axially-inwards pressure when it is required to remove a tube from the coupling. Moreover, the coupling can be locked by putting a clip between such a flange and the outer surface of the body of the coupling to prevent inward movement of the collet.

As will be apparent from the following description, this construction in which the collet can be inserted into the coupling from the outer end thereof furthermore greatly facilitates the manufacture of the collet.

In one form of construction according to the invention, a tube coupling comprises an outer member having an internal bore, a collet fitting in said bore from one end thereof and a seal, conveniently an O-ring seal, seated within said bore against a shoulder therein which shoulder faces the end from which the collet is inserted, the bore in said member, between the shoulder and the end from which the collet is inserted having a tapered section tapering from the larger diameter part enclosing the seal down to a smaller diameter portion within which the collet is slidable, and the collet including a portion of externally cylindrical form slidable in the reduced diameter portion of the sleeve, from which externally cylindrical portion there extends, in an axial direction, three or more resilient arms for gripping a tube, said arms having, on their outer faces, surface portions for engaging the tapered part of said bore, said collet furthermore having a cylindrical bore with inwardly extending projections at the ends of said arms remote from the cylindrical portion of the collet which inwardly extending portions have a sloping face on the surface of those portions facing towards the outer end of the collet and bore, the collet being so dimensioned that the collet may be forced into the bore in said member by flexing of said arms to permit the ends of the arms to move inwardly so that they can pass through the reduced diameter portion of the bore, and the inwardly extending projections on the collet arms being of such dimensions compared with the diameter of the enlarged portion of the bore and the outer surface of the collet arms that, when the collet is adjacent the seal, a tube can be forced through the collet to bear against the inwardly extending projections and, by reason of their slope, force the collet arms apart so that the tube passes through the collet and the seal to be resiliently gripped by the collet. With this construction, any pull on the tube causes the collet to slide in the bore. The engagement of the tapered surfaces of the bore and collet causes the collet arms to be pressed more tightly onto the tube thereby gripping the tube firmly against withdrawal. The tube however can be released from the coupling by pressing the collet into the bore whilst pulling on the tube. With the collet pressed into the bore, the collet arms are in a position where they can expand outwardly and hence the only grip on the tube is the resilient grip due to the resilience of these arms. It is thus possible to withdraw a tube if necessary although, in normal use, a pull on the tube serves to tighten the grip on the tube.

The aforesaid member may form part of other equipment to which the tube is to be coupled. For a coupling for coupling two tubes together, said member may be constituted by a single sleeve with a collet and O-ring inserted from each end. If the two tubes to be coupled are of identical size, the coupling is symmetrical. Obviously however couplings can be made for coupling tubes of different sizes if so desired.

It will be seen that this coupling comprises essentially an outer member, a collet and an O-ring and that the components can be assembled together with the O-ring, because of its resilience, being readily insertable into the bore and the collet then also being insertable into the bore from the open end thereof. It is thus possible if necessary to withdraw and replace a collet. This is in contrast to many forms of coupling using collets in which the collet has to be permanently retained within an outer member.

The bore in the aforesaid member preferably, beyond the O-ring seal, has a cylindrical portion of suitable diameter to be a close fit on the tube, this cylindrical portion terminating in a shoulder forming an abutment for the end of the tube.

To facilitate insertion of the collet into the bore, preferably the mouth of the bore has a tapered surface and the ends of the collet arms have correspondingly sloped surfaces for engaging the tapered mouth so that the collet arms are gradually forced inwardly as they enter the mouth of the bore.

Variations in tube diameters may readily be accommodated by interchangeable collets and O-rings. This is particulary convenient when different size tubes for example metric or imperial size tubes have to be connected to a common fitting.

It will be understood that, when reference is made to the outer member, this includes any bored member suitably shaped internally. It may be part of a valve or other fitting.

BRIEF DESCRIPTION OF THE DRAWINGS

FIG. 1, illustrating one embodiment of the invention, shows a sleeve and a collet in longitudinal section and separate from one another;

FIG. 2 shows the sleeve and collet of FIG. 1 assembled together;

FIG. 3 shows the coupling of FIG. 1 with a tube therein;

FIG. 4 is a view similar to FIG. 3 of another embodiment showing the use of a clip to prevent inward movement of the collet;

FIG. 5 is a section along the line 5—5 of FIG. 4;

FIG. 9 illustrates a modification of the coupling of FIG. 6; and

FIGS. 10 and 11 are sectional elevations illustrating a coupling for joining two tubes together.

DESCRIPTION OF THE PREFERRED EMBODIMENTS

Figure 6:
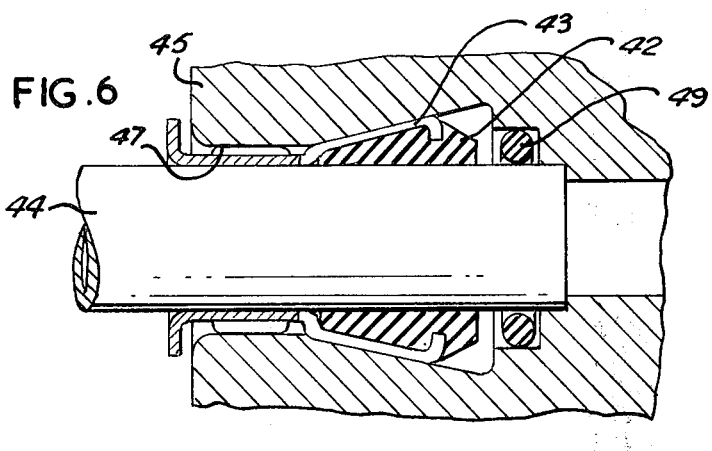
FIG. 6 illustrates a modification of the coupling of FIGS. 1 to 3.

Referring to FIGS. 1, 2 and 3, there is shown a body member in the form of a sleeve 10 which may be part of a valve or coupling insert or other device. It is shown diagrammatically with a cylindrical outer surface but, as will be apparent from the following description, the outer surface is immaterial to the function of the coupling and the bore within the sleeve may be formed in a device of any shape. Considering the bore from the outer end, that is to say the left-hand end of FIG. 1, it starts with a short convergent section 11 forming a mouth leading to a cylindrical portion 12 at the inner end of which there is a divergent portion 13 having, in this particular embodiment, a straight divergent taper which leads to an enlarged diameter portion 14. The end of the enlarged diameter portion 14 is formed by a shoulder 15 extending inwardly to a smaller diameter portion 16 which as explained later is of just sufficient size to accommodate the tube with which the coupling is to be used. The inner end of this portion 16 is terminated with a further shoulder 17 to form a stop for the tube when the tube is inserted, the bore continuing with a reduced diameter portion 18 forming a fluid flow passage.

The collet 20 has at its outer end a flange 21. From this flange there extends a cylindrical portion 22, the flange cylindrical portion being internally of a size just sufficient to accommodate the tube to be coupled and externally of a size to slide in the cylindrical portion 12 of the sleeve. At the inner end of the portion 22 the collet continues in the form of four axially extending arms 23 separated by slots 24. Each arm includes a reduced diameter portion 25 to permit flexing of the arm and, at the end furthest into the bore, has an enlarged diameter portion 26 with an external taper surface 27 matching the aforementioned taper of the divergent portion 13 in the bore of the tube. The collet is formed so that the arms thereof, in their normal position, are as shown in FIG. 1. The largest diameter portion occurs at 28 and, beyond this, there is a short sloping outer surface 29 leading towards the end of the collet which end has a surface 30 extending radially inwardly and backwardly towards the flange end of the collet. This sloping surface 30 leads down to a projecting portion 32 which, in the normal position of the collet arms as shown in FIG. 1, lies radially inwardly of the bore of the cylindrical portion 22 of the collet. From this projection 32, there is a sloping surface on the arms leading radially outwardly and backwardly towards the flange as shown at 33. This surface 33 extends to the cylindrical bore portion of the collet.

An O-ring seal 35 is inserted in the bore in the sleeve to rest against the shoulder 15 therein. If, for any reason it is required to remove this seal, this can readily be done with a hooked tool.

The collet 20 is put in the sleeve 10 from the open end thereof. The convergent inlet end 11 of the sleeve engages the sloping surface 29 on the end of the collet arms forcing these collet arms together. They flex at the portions 25 where they are of reduced thickness and this permits the collet to be inserted through the cylindrical portion 12 of the sleeve. The spacing between adjacent arms has to be made sufficient to permit of adequate inward deformation. When the collet arms have been passed through this portion, they can expand outwardly as shown in FIG. 2. It will be seen from this figure that the collet has a certain amount of play in the sleeve, being able to slide axially therein. Inward movement is limited by the collet bearing against the O-ring 35. On outward movement, the tapered surface 27 of the collet arms engage the tapered surface 13 of the bore of the sleeve. Removal of the collet is possible by pulling on it so as to force the arms inwardly together if it is necessary to dismantle the coupling.

To form a tube coupling, the collet and O-ring are assembled in thebore as shown in FIG. 2 and a tube is inserted therein from the open end of the collet in the direction indicated by the arrow X. The tube is shown in FIG. 3 at 40. It will be seen that, as it is inserted, it can be readily pressed through the greater part of the length of the collet which has a smooth cylindrical bore. The end of the tube will eventually bear against the surfaces 32 on the ends of the collet arms and will force these arms outwardly as shown in FIG. 3. The tube can then be forced on through the O-ring to bear against the shoulder 17 in the sleeve. The tube is thus resiliently gripped by the collet arms and is sealed in the coupling by the O-ring seal. If there is any outward pull on the tube, the tapered surfaces 27 of the collet arms engage the tapered surface 13 of the bore of the sleeve so forcing the arms inwardly to grip the tube more tightly. Thus the tube is held firmly against withdrawal. It is possible however to release a tube, if required, by holding the collet tightly in against the O-ring seal, thereby holding the collet arms in a position where they can be forced outwardly and then pulling on the tube to overcome the friction grip due to the resilience of the collet arms.

FIGS. 4 and 5 illustrate how a spring clip 41 can be put between the flange 21 and the outer end of the body member 10. The insertion of such a clip prevents the collet being pushed into the body member and hence prevents the tube being withdrawn. FIG. 4 also shows a step 36 between the surfaces 13 and 12. If the coupling is to pass a high pressure fluid, pressure on the O-ring 35 may force the collet back but this step prevents the collet being forced out of the sleeve 10.

Figure 7:
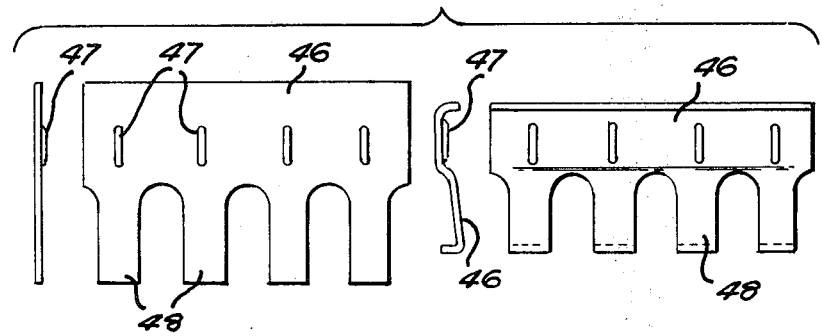
FIGS. 7 and 8 illustrate one method of making a collet as used in the construction of FIG. 6.
Figure 8:
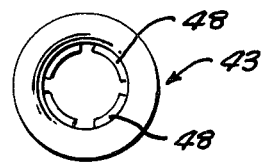

In some cases, e.g. where the tube is a glass tube or where it is the outer sheath of an electric cable, e.g. a mineral insulated metal sheathed cable, it may be desirable to have a protective bush around the tube made of elastomeric material which will grip the tube firmly when the arms are pressed into the plastics material. Such a construction is shown in FIG. 6 in which a bush 42 or rubber or plastics elastomeric material is provided within a collet 43 to hold a tube 44 within a body member 45. In this construction, the collet may be of relatively thin material; whilst it may be die-cast, conveniently, it is formed of strip material, as shown in FIGS. 7 and 8. FIG. 7 shows flat strip material 46 in plan after shaping to have indents 47 and four arms 48 while FIG. 8 is an end view of the material before it is shaped into the collet 43.

In FIG. 6, there is shown a separate O-ring seal 49 between the bush and the shoulder in the body member. The O-ring might be located over the periphery of the bush. With an elastomeric bush around the tube, it is possible, as shown in FIG. 9 to have one piece bush and seal 50 for gripping a tube 51 and sealing it into a body member 52.

Another way of forming a collet such as collet 43 of FIG. 6 is by deep drawing from a circular metal blank and then piercing and slotting to form the required arms.

FIGS. 10 and 11 illustrate a tube coupling for joining two tubes 55, 56. The coupling comprises an outer sleeve 57 containing an O-ring seal 58 in a central groove 59. Two similar collets 60, 61 are located in the sleeve, one at each end, each having an associated O-ring seal 62. These collets are similar to the collet of FIGS. 1 to 3. To join the tubes 55, 56 together, the coupling is first put over tube 55, as shown in FIG. 10. To do this, the collet 61 must be held inwardly, that is pushed to the left with respect to the sleeve, so that the tube 55 can pass right through the coupling. Tube 56 is then located in position and a force applied to collet 60 so that this collet is held in the release position enabling the coupling to slide back along tube 55, the tube 56 entering into collet 61.

I claim:

1. In a tube coupling of the kind having a collet comprising a cylindrical portion with a cylindrical base and with resilient arms arranged to cooperate with a cam surface which cam surface is extending axially from one end of said cylindrical portion constituted by a member surrounding the collet and having an internal surface tapering to a smaller diameter in one axial direction engaging the arms so that the arms are forced inwardly by axial movement of the collet in said one direction, the improvement wherein the arms have, near their outer ends, radially inwardly extending projections which, when the aforesaid cam surface and tapered surfaces are engaged to force the arms inwardly, extend radially inwardly to positions nearer the axis of the collet than the surface defined by said cylindrical bore, and when the arms of the collet are spaced apart in the circumferential direction such that, in the absence of any tube within the collet, the arms can move inwardly to permit of the collet being withdrawn from said member by axial movement in said one direction and wherein said member has a shoulder facing the ends of the arms of the collet, the shoulder defining a bore of smaller diameter than the bore through the collet.

2. A tube coupling as claimed in claim 1 and comprising a unitary body member incorporating said cam surface together with a collet and an O-ring elastomeric seal retained in the body member by the collet.

3. A tube coupling as claimed in claim 1 wherein the collet, outside said member, extends radially outwardly to be larger than the bore in said member forming the cam surface.

4. A tube coupling as claimed in claim 3 wherein the collet has a radially extending flange at its outer end.

5. A tube coupling as claimed in claim 4 and having a removable clip around the collet between the flange and said member for preventing movement of the collet into said member and thereby preventing radially outward movement of said arms, whereby said clip enables a tube to be secured against removal from the collet.

6. A tube coupling as claimed in claim 5 wherein said clip is a spring clip.

7. A tube coupling comprising an outer member having an internal bore, a collet fitting in said bore from one end thereof and a seal seated within said bore against a shoulder therein which shoulder faces the end from which the collet is inserted, the bore in said member, between the shoulder and the end from which the collet is inserted having a tapered section tapering from the larger diameter part enclosing the seal down to a smaller diameter portion within which the collet is slidable, and the collet including a portion of externally cylindrical form slidable in the reduced diameter portion of said bore, from which externally cylindrical portion there extends, in an axial direction, three or more resilient arms for gripping a tube, said arms having, on their outer faces, surface portions for engaging the tapered part of said bore, said collet furthermore having a cylindrical bore with inwardly extending projections at the ends of said arms remote from the cylindrical portion of the collet which inwardly extending portions have a sloping face on the surface of those portions facing towards the outer end of the collet and bore, and the inwardly extending projections on the collet arms being of such dimensions compared with the diameter of the enlarged portion of the bore and the outer surface of the collet arms that, when the collet is adjacent the seal, a tube can be forced through the collet to bear against the inwardly extending projections and force the collet arms apart so that the tube passes through the collet and the seal to be resiliently gripped by the collet.

8. A tube coupling as claimed in claim 7 wherein said seal is an O-ring seal.

9. A tube coupling as claimed in claim 7 and for coupling two tubes together wherein said member is constituted by a single sleeve with a separate collet and O-ring inserted from each end.

10. A tube coupling as claimed in claim 7 wherein the bore in said member, beyond the seal, has a cylindrical portion of suitable diameter to be a close fit on the tube, this cylindrical portion terminating in a shoulder forming an abutment for the end of the tube.

11. A tube coupling as claimed in claim 10 wherein, to facilitate insertion of the collet into the bore, the mouth of the bore has a tapered surface and the ends of the collet arms have correspondingly sloped surfaces for engaging the tapered mouth so that the collet arms are gradually forced inwardly as they enter the mouth of the bore.

12. A tube coupling as claimed in claim 7 wherein the collet has a flange at its outer end.

13. A tube coupling as claimed in claim 1 and having an elastomeric bush around the tube within the collet.

14. A tube coupling as claimed in claim 7 wherein said bore has a second shoulder located between the smaller diameter end of the tapered section and said smaller diameter portion of the bore and facing in the opposite direction to the first mentioned shoulder and wherein said arms have outwardly extending portions at the ends of said arms remote from the cylindrical portion of the collet to form abutment surfaces limiting axial movement of the collet in said bore by engaging said second shoulder.

15. A tube coupling of the kind having a collet and a body portion, said collet comprising a cylindrical portion with a cylindrical bore and resilient arms extending axially from said cylindrical portion, said body portion having a bore open at one end and in which said cylindrical portion of the collet is slidable, said bore in the body portion remote from the open end having an enlarged portion having as internal surface forming a cam surface, said internal surface tapering to a smaller diameter in the axial direction towards the open end of the bore, which tapered surface engages said arms so that the arms are forced inwardly by axial movement of the collet towards the open end of the bore in the body portion, the collet having its arms spaced apart in the circumferential direction such that, in the absence of any tube within the collet, the arms can be moved inwardly to lie partially within a cylinder of the diameter defined by the bore in the body portion and wholly with a cylinder of the diameter defined by said cylindrical portion of the collet, whereby the collet is insertable in the bore from the open end thereof and whereby axial movement of the collet, by engagement of the arms with said tapered surface enables the arms to be forced inwardly of the minimum diameter of the collet for gripping a tube inserted therein, and wherein said bore in the body portion has, beyond said tapered surface, a part of smaller diameter than the cylindrical bore in said collet.

16. A tube coupling as claimed in claim 15 wherein said arms have radially outwardly extending portions at the ends of the arms remote from the cylindrical portion of the collet and wherein said bore in said body portion has a shoulder located between the smaller diameter end of the tapered surface and the open end of the bore in the body portion, said shoulder facing away from said open end of the bore, said shoulder and said outwardly extending portions on said arms forming complementary abutment surfaces to limit axially outward movement of the collet.

17. A tube coupling as claimed in claim 15 and having a bush of elastomeric material located axially of the bore of the collet within the arms of the collet.

18. A tube coupling as claimed in claim 17 wherein the collet is formed of metal strips of uniform thickness.

* * * * *

UNITED STATES PATENT OFFICE
CERTIFICATE OF CORRECTION

Patent No. 4,005,883         Dated February 1, 1977

Inventor(s) JOHN DEREK GUEST

It is certified that error appears in the above-identified patent and that said Letters Patent are hereby corrected as shown below:

In the specification, cover page, column 1, line 8, concerning the Foreign Application Priority Data, cancel "May 8, 1974" and substitute therefor - August 5, 1974 - - .

Signed and Sealed this

Twenty-eighth Day of June 1977

[SEAL]

Attest:

RUTH C. MASON
*Attesting Officer*

C. MARSHALL DANN
*Commissioner of Patents and Trademarks*